United States Patent [19]
Wirges et al.

[11] 4,240,619
[45] Dec. 23, 1980

[54] GAS SPRING FOR BALANCING THE WEIGHT OF THE LID ON THE TRUNK OF A MOTORCAR AND LIKE APPLICATIONS

[75] Inventors: Winfried Wirges, Koblenz; Guenter Bauschke, Neuhäusel, both of Fed. Rep. of Germany

[73] Assignee: Stabilus GmbH, Koblenz-Neuendorf, Fed. Rep. of Germany

[21] Appl. No.: 927,417

[22] Filed: Jul. 24, 1978

[30] Foreign Application Priority Data

Jul. 29, 1977 [DE] Fed. Rep. of Germany ....... 2734276

[51] Int. Cl.³ .......................... E05F 15/02; F16F 9/02
[52] U.S. Cl. .................................. 267/65 R; 267/120; 267/126; 267/129
[58] Field of Search ..................... 267/120, 124, 65 R, 267/64 R, 64 A, 64 B, 125–129; 248/354 H; 188/282, 316–317

[56] References Cited
U.S. PATENT DOCUMENTS

| | | | |
|---|---|---|---|
| 3,938,793 | 2/1976 | Kaptanis et al. | 188/300 X |
| 3,963,227 | 6/1976 | Mölders | 267/120 |
| 4,045,008 | 8/1977 | Bauer | 267/120 |
| 4,096,928 | 6/1978 | Krafzig et al. | 188/282 |
| 4,113,071 | 9/1978 | Müller et al. | 188/282 |
| 4,156,523 | 5/1979 | Bauer | 267/120 |

FOREIGN PATENT DOCUMENTS

| | | |
|---|---|---|
| 139908 | 7/1947 | Australia . |
| 1857484 | 6/1962 | Fed. Rep. of Germany . |
| 2555062 | 6/1977 | Fed. Rep. of Germany . |
| 2623873 | 12/1977 | Fed. Rep. of Germany . |
| 1178606 | 1/1970 | United Kingdom . |

*Primary Examiner*—Douglas C. Butler
*Attorney, Agent, or Firm*—Brumbaugh, Graves, Donohue & Raymond

[57] ABSTRACT

A gas spring includes a cylinder, filled with compressed gas, a piston rod movable axially inward and outward of the cylinder cavity, and a piston axially movable on the end of the piston rod in the cavity and resiliently biased into engagement with an abutment on the free end of the piston rod. One of two passages bounded by the piston and connecting the two compartments into which the cylinder cavity is divided by the piston is blocked when the piston engages the abutment and opened when the piston is moved away from the abutment against the resilient bias. The other passage is opened during outward movement of the piston rod from the cylinder cavity.

12 Claims, 3 Drawing Figures

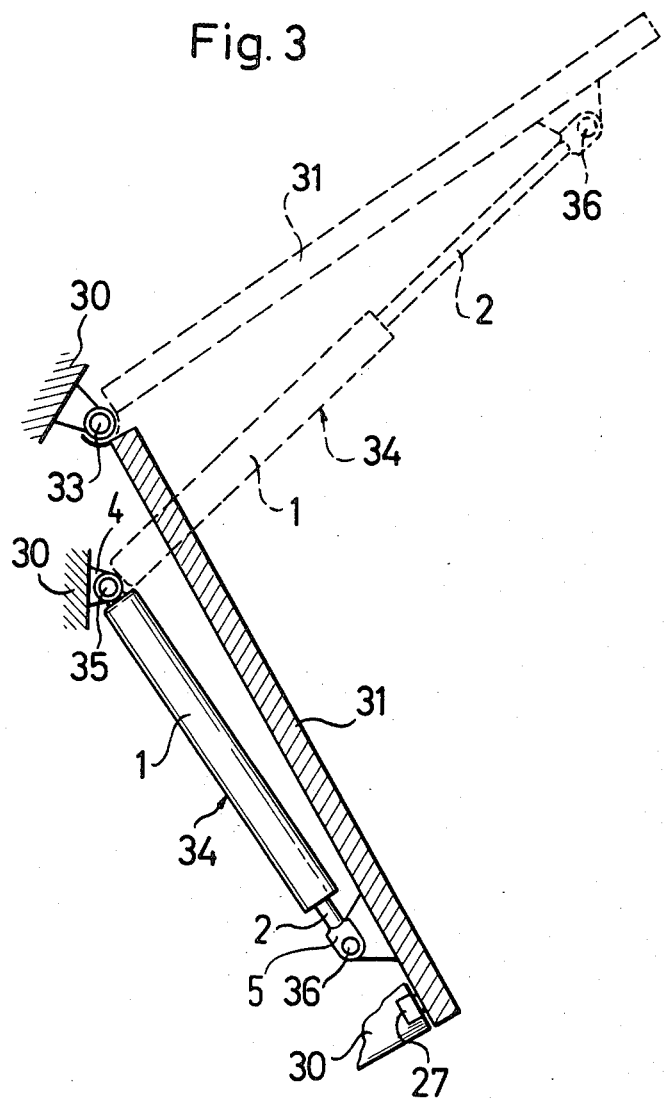

GAS SPRING FOR BALANCING THE WEIGHT OF THE LID ON THE TRUNK OF A MOTORCAR AND LIKE APPLICATIONS

BACKGROUND

1. Field of the Invention

This invention relates to gas springs, and particularly to a gas spring suitable for at least partly balancing the weight of the trunk lid of a motor car and like applications, and to a gas spring arrangement including at least one such spring.

2. The Prior Art

Gas springs of the type with which this invention is concerned are employed widely for facilitating the operation of trunk lids, motor compartment hoods, tail gates, and similar covers on cavities in a car, truck, or bus body, and analogous applications are being found in other fields in which a structural member needs to be moved relative to a support in a path having a vertical component. The invention will be described hereinbelow in its specific application to an automotive trunk lid, but it is not limited thereto.

When a gas spring is arranged between the body and the pivotally mounted trunk lid of an automotive vehicle, the gas pressure in the spring is chosen so that the lid swings upward from its lowermost position when the lock holding it in the closed position is opened. In the most common gas springs in current practical use, the gas pressure is sufficient fully to open the lid and to hold it in the open position although the biasing force of the expanding gas in the spring decreases as the lid rises. When it is desired to close the lid, the operator moves the lid down against the restraint of the gas in the spring. The usual spring cannot hold the lid in a partly opened position, as would be desirable, for example, if skis carried on the roof of the vehicle extend into the path of upward movement of the trunk lid and collide with the fully opened lid.

In a modified gas spring known from the German published patent application No. 2,345,503, the initial gas pressure is not sufficient for moving the lid into the fully open position, and that position is reached only with an operator's manual assistance and maintained thereafter by a locking device. The lid needs to be moved further away from the closed position to release it from the locking device, and it thereafter closes automatically under its own weight. This release movement in a direction opposite to the desired downward direction of movement is inconvenient to many operators.

SUMMARY

It is a primary object of this invention to provide a gas spring suitable for use with a trunk lid or the like in the manner described above which permits the lid or other movable structural member to be held fast in any portion of its path of movement on a support, and which permits easy operation.

In one of its more specific aspects, the invention provides a gas spring in which a piston rod is axially movable inward and outward of a sealed cavity in a cylinder, respective axially terminal portions of the piston rod being located in the cavity and outside the cavity in all axial positions of the piston rod. A piston is axially movable on the piston rod in the cylinder cavity. It axially separates two compartments of the cavity from each other and bounds a passage connecting the compartments. A yieldably resilient device is operatively interposed between the piston and the piston rod axially to bias the piston toward a position of abutting engagement with an abutment on the axially terminal portion of the piston rod in the cylinder cavity. A fluid under superatmospheric pressure fills the compartments and biases the piston rod outward of the cavity. A blocking device blocks the aforementioned passage when the piston engages the abutment on the piston rod and responds to movement of the piston away from its abutment-engaging position against the restraint of the resilient device for opening the passage.

In another aspect, the invention resides in a gas spring arrangement in which a structural member is mounted on a support for movement in a path having a vertical component between a lowermost and a topmost position. The piston rod and cylinder of a gas spring are secured to the support and to the structural member in such a manner that the member is moved upward from its lowermost position against the force of gravity when the piston rod moves outward of the cylinder cavity under the biasing force of a fluid under superatmospheric pressure which fills the two compartments of the cylinder cavity separated by a piston movable axially on the piston rod and axially biased toward a position of engagement with an abutment on the axially terminal portion of the piston rod in the cavity. The initial pressure of the fluid in the cylinder decreases during upward movement of the structural member and is insufficient for moving the structural member into its topmost position against the force of gravity.

A first valve opens a first flow path between the two compartments in response to movement of the piston rod outward of the cylinder cavity and closes the flow path during inward piston rod movement and a second valve responds to axial movement of the piston away from the abutment on the piston rod by similarly connecting the compartments through a second flow path which is closed when the piston engages the abutment.

BRIEF DESCRIPTION OF THE DRAWINGS

Other features, additional objects, and many of the attendant advantages of this invention will readily be appreciated as the same becomes better understood by reference to the following detailed description of a preferred embodiment when considered in connection with the appended drawing in which:

FIG. 3 is a fragmentary side elevation of an automotive vehicle including the spring of FIGS. 1 and 2.

DETAILED DESCRIPTION

Figure 1:
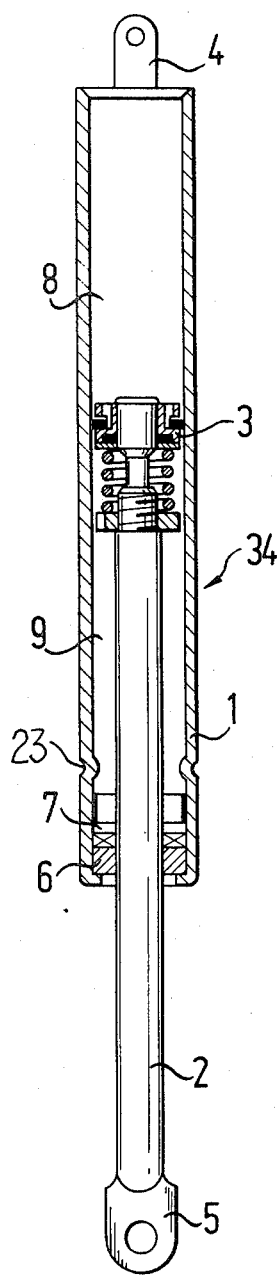
FIG. 1 shows a gas spring of the invention in elevational section on the axis of its cylinder.

Referring initially to FIG. 1, there is seen a gas spring 34 whose cylinder 1 is of uniform, circular cross section over its entire length except as specifically stated hereinbelow. A cylindrical piston rod 2 projects downward and axially outward of the cylinder cavity, and its axially terminal top portion carries a piston 3. Mounting lugs 4, 5 on the imperforate, upper, radial end wall of the cylinder 1 and on the axially terminal portion of the piston rod 2 outside the cylinder cavity permit the spring 34 to be installed as will presently be described with reference to FIG. 3. An annular end wall 7 of the cylinder 1 and a packing 6 contiguously adjacent the end wall 7 permit the piston rod 2 to move axially inward and outward of the sealed cylinder cavity which is axially divided by the piston 3 into two compartments 8, 9. Nitrogen fills the compartments 8, 9 under superatmospheric pressure in all operative conditions of the spring 34.

A small indentation 23 of approximately spherically arcuate shape in the outer surface of the cylinder 1 closely adjacent, but above the sealed bottom end of the cylinder 1 at the end wall 7 corresponds to a small projection on the inner face of the cylinder wall and serves a purpose presently to be described more fully.

Figure 2:
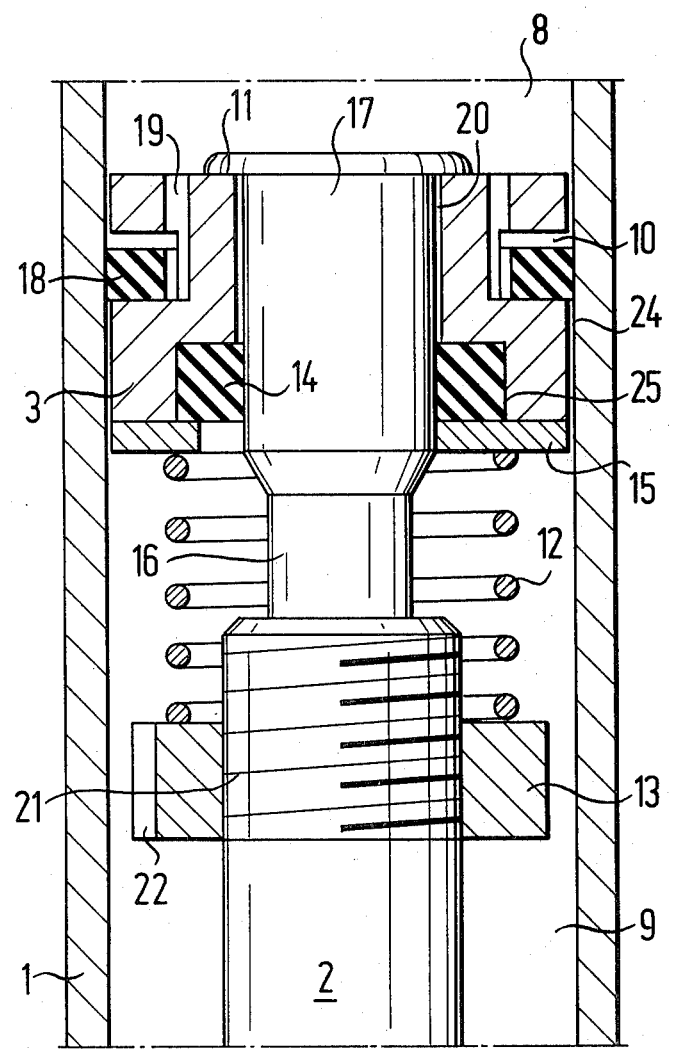
FIG. 2 illustrates a portion of the spring of FIG. 1 on a larger scale.

As is seen in FIG. 2 on a larger scale, the outer diameter of the piston 3 is slightly smaller than the inner diameter of the cylinder 1 so as to leave a narrow, annular gap 24 therebetween. The gap communicates with an annular groove 10 in the outer circumference of the piston which, in the condition illustrated in FIG. 2, is held in abutting, axial engagement with an enlarged head 11 at the free end of the piston rod 2 by a helical compression spring 12. The spring 12, under stress in all operative conditions, is backed by a spring seat 13 on the piston rod 3. It engages a washer 15 which axially abuts against the radial bottom face of the piston 3 and against a resilient sealing ring 14 received in a downwardly open recess 25 in the piston 3. The axial stress transmitted from the spring 12 to the ring 14 by the washer 15 holds the ring 14 in sealing engagement with a cylindrical sealing face 17 on the axially terminal portion of the piston rod 2 seen in FIG. 2 so as to block the bottom end of an annular gap 20 between the sealing face 17 and the piston 3. Another axial portion 16 of the piston rod 2 is of reduced cross sectional area.

An elastomeric piston ring 18 of rectangular cross section is received in the radially open groove 10 under radial compressive stress exerted by the inner wall of the cylinder 1. The axial width of the ring 18 is smaller than the corresponding dimension of the groove 10 so as to permit limited axial movement of the piston ring 18 in the groove 10 which communicates freely in the illustrated condition with the compartment 8 through several axial bores or passages 19 in the piston 3.

The spring seat 13 is internally threaded and engages mating threads 21 on the piston rod 2. A notch 22 in the outer circumference of the spring seat 13 is dimensioned to receive the projection of the inner cylinder wall shown in FIG. 1 in line with the indentation 23.

FIG. 3 shows only as much of a motor vehicle equipped with one or more gas springs 34 as is needed for an understanding of the invention. Only those portions of a motorcar body 30 are illustrated which provide support for or otherwise cooperate with a trunk lid 31 and the sole gas spring 34 visible in FIG. 3, a second gas spring, if provided, being mounted in the same manner and obscured by the illustrated spring.

One horizontal edge of the trunk lid 31 is fastened to the body 30 by a hinge 33 having a horizontal axis. A pivot pin 35 below the hinge 33 passes through the mounting lug 4 and secures the cylinder 1 to the body 30. Another pivot pin 36 near the lower horizontal edge of the lid 31 passes through the mounting lug 5 on the piston rod 2. A latch on the lid 31 engages a lock 27 on the body 30 in the closed position of the lid 31 shown in fully drawn lline. When the lock 27 is opened, gas pressure in the spring 34 expels the piston rod 2 from the cylinder 1 and initiates movement of the lid 31 toward a topmost open position shown in broken lines.

The internal operating elements of the gas spring 34, not themselves visible in FIG. 3, control the position of the lid 31 in a manner evident from FIG. 2. When the lock 27 no longer prevents outward movement of the piston rod 2 from the cylinder 1, the gas in the cylinder 1 causes the piston 3 and piston rod 2 to move downward from the illustrated position. The ring 18 is retained by frictional engagement with the cylinder wall and quickly lifts from the upper orifice of the gap 24, thereby permitting passage of fluid from the shrinking compartment 9 through a continuous flow path provided by the gap 24, the groove 10, and the bores 19 into the expanding compartment 8. The gas flow, however, is not sufficient to compensate for the increase in the capacity of the compartment 8 so that the gas expands, and its initial pressure is selected so that the force exerted by the gas on the lid 31 is balanced by the force of gravity acting on the lid before the latter reaches its fully open, topmost position. A small excess of upward over downward forces is readily provided by an operator further lifting the lid into a desired position. When he thereafter releases the lid, it drops sufficiently to cause return of the piston ring 18 into the illustrated position relative to the piston 3 in which its blocks the return flow of gas from the compartment 8 into the compartment 9 that would be necessary for further downward movement of the lid 31 against the gas pressure in the compartment 8 which itself is insufficient at this stage to balance the weight of the lid. The lid may thus be arrested in any open position of its arcuate upward path to which it cannot be brought by gas pressure in the spring 34 alone.

When the lid 31 is to be closed, manual downward pressure is brought to bear on it so that the piston rod 2 is pushed inward of the cylinder cavity, thereby maintaining the illustrated position of the piston ring 18 and compressing the gas cushion in the compartment 8. When the pressure differential between the compartments 8, 9 becomes great enough, it shifts the piston 3 relative to the piston rod 2 against the restraint of the spring 12 so that the sealing ring 14 is lifted axially from the sealing face 17 and radially aligned with the reduced sealing rod portion 16. Fluid can now flow from the compartment 8 into the compartment 9 under the manually applied force aided by gravity and overcoming the resistance of the gas in the spring against the inward movement of the piston rod 2.

The response of the piston 3 to a pressure differential between the compartments 8, 9 may be varied by axially shortening or lengthening the spring 12. When the piston rod 2 is pulled out of the cylinder cavity as far as possible, the notch 22 in the spring seat 13 may be engaged by the projection over the indentation 23 and thereby secured against angular movement about the cylinder axis. The piston rod 2, when not installed in the manner shown in FIG. 3, is freely rotatable in the cylinder 1, and the spring seat 13 moves axially relative to the rod 2 when the latter is turned and the seat prevented from participating in the rotary movement.

The fluid pressure in the cylinder 1 is set by connecting the cylinder cavity with a gas tank through a filling nipple on the cylinder, conventional and not illustrated, and may be increased or decreased to match the weight of the trunk lid 31 or other structural member whose weight is to be balanced during a portion of its upward movement.

The piston ring 18 may be replaced by another valve which responds to the direction of movement of the piston rod 2 and the piston 3 relative to the cylinder 1 for opening and closing a flow path between the compartments 8, 9, and the cooperating spring 12, sealing ring 14 and sealing face 17 are merely illustrative of a check valve which responds to the direction and magnitude of a pressure differential between the compartments 8, 9 for opening and closing another passage between the two compartments. The specifically illustrated valve arrangements combine simplicity of structure with ruggedness and a long useful life in a particularly advantageous manner.

The illustrated gas spring is filled with nitrogen, air, or another inert gas at superatmospheric pressure, but the gas in the cylinder cavity may be replaced in part by liquid if the damping characteristics of a more viscous fluid are preferred, a gas cushion in contact with the liquid or separated from the same by a conventional floating piston providing the necessary pressure.

It should be understood, therefore, that the foregoing disclosure relates only to a preferred embodiment, and that it is intended to cover all changes and modifications of the example of the invention herein chosen for the purpose of the disclosure which do not constitute departures from the spirit and scope of the invention set forth in the appended claims.

What is claimed is:

1. A gas spring apparatus, comprising:
   (a) a support;
   (b) a structural member mounted on said support for movement in a path having a vertical component between a lowermost and topmost position;
   (c) a gas spring including
      (1) a cylinder defining a sealed cavity therein and having an axis,
      (2) a piston rod axially movable in sealing engagement with said cylinder inward and outward of said cavity, respective axially terminal portions of said piston rod being located in said cavity and outside said cavity in all axial positions of said piston rod,
      (3) a piston axially movable on said piston rod in said cavity, said piston separating two compartments of said cavity from each other,
      (4) abutment means on the axially terminal portion of said piston rod in said cavity,
      (5) yieldably resilient means operatively interposed between said piston and said piston rod and axially biasing said piston towards a position of abutting engagement with said abutment means, and
      (6) a fluid under superatmospheric pressure filling said compartments and biasing said piston rod outward of said cavity in a predetermined axial position of the piston rod relative to said cylinder;
   (d) securing means securing said piston rod and said cylinder to said support and to said structural member, respectively, in such a manner that said member is moved upward from said lowermost position thereof against the force of gravity when said piston rod moves outward of said cavity from said predetermined position, the biasing force of said fluid being insufficient for moving said member to said topmost position against said force of gravity;
   (e) first valve means responsive to movement of said piston rod outward of said cavity for opening a first flow path between said compartments and to movement of said piston rod inward of said cavity for closing said flow path; and
   (f) second valve means for opening a second flow path between said compartments upon axial movement of said piston away from said position of abutting engagement against the restraint of said yieldably resilient means and for closing said second flow path when said piston is in said position of abutting engagement.

2. Apparatus as set forth in claim 1, wherein said second valve means includes (1) means defining a sealing face on said piston rod and (2) a sealing member normally engaging said sealing face under the biasing force of said yieldably resilient means when said piston is in said position of abutting engagement, said piston moving said sealing member out of engagement with said sealing face when moving away from said abutment means.

3. Apparatus as set forth in claim 2, wherein said sealing member is annular about said axis and radially envelops said sealing face when said second valve means is closed, said piston rod having a face portion of smaller cross sectional area axially adjacent said sealing face, said sealing member encircling said smaller cross sectional face portion in radially spaced relation thereto when said sealing member is axially aligned therewith by said moving away of said piston.

4. Apparatus as set forth in claim 1, wherein said piston and said cylinder define a first passage therebetween open toward one of said compartments, and said piston is formed with a circumferential groove communicating with said passage and with a second passage connecting said groove to the other compartment, said first valve means including a piston ring secured in said groove for limited movement between two axial positions in sealing, frictional engagement with said cylinder, said piston ring sealing one of said passages from said groove in one of said axial positions thereof.

5. Apparatus as set forth in claim 1, further comprising adjustment means for varying the biasing force of said yieldably resilient means.

6. Apparatus as set forth in claim 1, wherein said structural member is pivotally mounted on said support for movement in said path about a horizontally extending axis.

7. A gas spring, comprising:
   (a) a cylinder defining a sealed cavity therein and having an axis;
   (b) a piston rod axially movable in sealing engagement with said cylinder inward and outward of said cavity, respective axially terminal portions of said piston rod being located in said cavity and outside said cavity in all axial positions of said piston rod;
   (c) a piston located within said cavity and separating said cavity into two axially spaced compartments, said piston being mounted on the inner end of said piston rod for movement relative thereto between a first, axially inner position and a second, axially outer position along said piston rod;
   (d) resilient means carried by said piston rod for resiliently urging said piston towards said first, axially inner position and for resiliently resisting movement of said piston towards said second, axially outer position;
   (e) a fluid under superatmospheric pressure in said compartments and biasing said piston rod outward of said cavity;
   (f) first valve means responsive to movement of said piston rod outward of said cavity for opening a first flow path between said compartments and to movement of said piston rod inward of said cavity for closing said first flow path;

(g) second valve means carried by at least one of said piston and said piston rod for opening a second flow path between said compartments when said piston is in said second, axially outer position and for closing said second flow path when said piston is in said first, axially inner position, fluid flow across said piston being substantially prevented when said first flow path is closed and said piston is in said first, axially inner position, thereby preventing any substantial inward movement of said piston rod, until, upon the application of sufficient inward force on said piston rod to overcome the resistance of said resilient means, said piston is moved from said first, axially inner position to said second, axially outer position to permit fluid flow across said piston through said second flow path.

8. A gas spring as set forth in claim 7, wherein said second valve means comprises:

means defining a first, larger cross sectional portion of said piston rod at said first, axially inner position of said piston, means defining a second, smaller cross sectional portion of said piston rod at said second, axially outer position of said piston; and sealing means interposed between said piston and said piston rod for coacting with said first cross sectional portion of said piston rod to close said second flow path when said piston is in said first, axially inner position and for coacting with said second smaller cross sectional portion to open said second flow path when said piston is in said second, axially outer position.

9. A gas spring, comprising:

(a) a cylinder defining a sealed cavity therein and having an axis;

(b) a piston rod axially movable in sealing engagement with said cylinder inward and outward of said respective axially terminal portions of said piston rod being located in said cavity and outside said cavity in all axial positions of said piston rod;

(c) a piston located within said cavity and separating said cavity into two axially spaced compartments, said piston being mounted on the inner end of said piston rod for movement relative thereto between a first, axially inner position and a second, axially outer position along said piston rod;

(d) resilient means, including means defining a spring seat on said piston rod and a compression spring axially interposed between said piston and said spring seat, for resiliently urging said piston towards said first, axially inner position and for resiliently resisting movement of said piston towards said second, axially outer position;

(e) a fluid under superatmospheric pressure in said compartments and biasing said piston rod outward of said cavity;

(f) first valve means responsive to movement of said piston rod outward of said cavity for opening a first flow path between said compartments and to movement of said piston rod inward of said cavity for closing said first flow path; and (g) second valve means carried by at least one of said piston and said piston rod for opening a second flow path between said compartments when said piston is in said second axially outer position and for closing said second flow path when said piston is in said first, axially inner position.

10. A gas spring as set forth in claim 9, further comprising cooperating engagement means on said spring seat and on said cylinder for limiting angular movement of said spring seat about said axis in a predetermined axial position of said piston rod, said piston rod being rotatable in said cylinder and carrying threads about said axis at the location of said spring seat means, said spring seat means matingly engaging said threads, whereby the spacing of said spring seat from said first, axially inner position of said piston may be varied by turning said piston rod about said axis while in said predetermined axial position, thereby to permit adjustment of the force exerted on said piston by said spring.

11. A gas spring as set forth in claim 9, wherein said second valve means comprises:

means defining a first, larger cross sectional portion of said piston rod at said first, axially inner position of said piston, means defining a second, smaller cross sectional portion of said piston rod at said second, axially outer position of said piston; and sealing means interposed between said piston and said piston rod for coacting with said first cross sectional portion of said piston rod to close said second flow path when said piston is in said first, axially inner position and for coacting with said second smaller cross sectional portion to open said second flow path when said piston is in said second, axially outer position.

12. A gas spring as set forth in claim 11, further comprising cooperating engagement means on said spring seat and on said cylinder for limiting angular movement of said spring seat about said axis in a predetermined axial position of said piston rod, said piston rod being rotatable in said cylinder and carrying threads about said axis at the location of said spring seat means, said spring seat means matingly engaging said threads, whereby the spacing of said spring seat from said first, axially inner position of said piston may be varied by turning said piston rod about said axis while in said predetermined axial position, thereby to permit adjustment of the force exerted on said piston by said spring.

* * * * *

UNITED STATES PATENT AND TRADEMARK OFFICE
CERTIFICATE OF CORRECTION

PATENT NO. : 4,240,619

DATED : December 23, 1980

INVENTOR(S) : Winfried Wirges and Guenter Bauschke

It is certified that error appears in the above—identified patent and that said Letters Patent is hereby corrected as shown below:

Col. 3, line 63, "lline" should read --line--;

Col. 7, line 42, after "said" (1st occurrence) insert --cavity,--.

Signed and Sealed this

Tenth Day of March 1981

[SEAL]

Attest:

RENE D. TEGTMEYER

Attesting Officer     Acting Commissioner of Patents and Trademarks